(12) United States Patent  
Higashida

(10) Patent No.: US 9,066,356 B2  
(45) Date of Patent: Jun. 23, 2015

(54) WIRELESS COMMUNICATION SYSTEM PROVIDED IN AIRCRAFT FOR COMMUNICATING USING PLURAL WIRELESS CHANNELS

(71) Applicant: Panasonic Intellectual Property Management Co., Ltd., Osaka (JP)

(72) Inventor: Masaaki Higashida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/718,024

(22) Filed: Dec. 18, 2012

(65) Prior Publication Data

US 2013/0170448 A1 Jul. 4, 2013

Related U.S. Application Data

(62) Division of application No. 12/162,636, filed as application No. PCT/JP2007/063367 on Jul. 4, 2007, now abandoned.

(30) Foreign Application Priority Data

Jul. 4, 2006 (JP) ................................. 2006-184057

(51) Int. Cl.
*H04W 4/00* (2009.01)
*H04W 74/08* (2009.01)
*H04H 20/62* (2008.01)
(Continued)

(52) U.S. Cl.
CPC ....... *H04W 74/0816* (2013.01); *H04B 7/18506* (2013.01); *H04H 20/62* (2013.01); *H04W 84/005* (2013.01)

(58) Field of Classification Search
CPC .. H04B 7/18506; H04H 20/62; H04W 84/005
See application file for complete search history.

(56) References Cited

U.S. PATENT DOCUMENTS 5,345,474 A 9/1994 Hoshikawa  
7,440,432 B2 * 10/2008 Niiho et al. ................... 370/338  
(Continued)

FOREIGN PATENT DOCUMENTS

EP 1 478 106 11/2004  
JP 4-142818 5/1992  
(Continued)

OTHER PUBLICATIONS

Office Action issued Jan. 4, 2013 in related U.S. Appl. No. 12/162,636.

(Continued)

*Primary Examiner* — David Oveissi  
(74) *Attorney, Agent, or Firm* — Wenderoth, Lind & Ponack, L.L.P.

(57) ABSTRACT

In a wireless communication system including a plurality of wireless stations provided in a structure having a radio wave shield arranged at a fixed position, at least one of two wireless stations using an identical wireless channel and two wireless stations using wireless channels adjacent to each other are allocated on both sides of the radio wave shield, respectively. In this case, the structure is an aircraft, and the two wireless stations are allocated on different aisles of the aircraft, respectively. In addition, the two wireless stations are allocated to be apart from each other in a longitudinal direction of the aircraft.

4 Claims, 14 Drawing Sheets

(51) Int. Cl.
*H04B 7/185* (2006.01)
*H04W 84/00* (2009.01)

(56) References Cited

U.S. PATENT DOCUMENTS

| | | |
|---|---|---|
| 7,483,696 B1 | 1/2009 | Mitchell |
| 7,496,361 B1 | 2/2009 | Mitchell et al. |
| 2003/0009761 A1 | 1/2003 | Miller et al. |
| 2004/0098745 A1 | 5/2004 | Marston et al. |
| 2004/0229607 A1 | 11/2004 | La Chappelle et al. |
| 2005/0181723 A1 | 8/2005 | Miller et al. |
| 2006/0198332 A1* | 9/2006 | Niiho et al. .................. 370/328 |
| 2006/0221895 A1 | 10/2006 | Mori et al. |
| 2007/0002797 A1 | 1/2007 | Lai |

FOREIGN PATENT DOCUMENTS

| | | |
|---|---|---|
| JP | 7-212828 | 8/1995 |
| JP | 7-336363 | 12/1995 |
| JP | 2002-112318 | 4/2002 |
| JP | 2003-209508 | 7/2003 |
| JP | 2006-33564 | 2/2006 |
| JP | 2006-506899 | 2/2006 |
| JP | 2006-101106 | 4/2006 |
| WO | 02/101995 | 12/2002 |
| WO | 03/032503 | 4/2003 |

OTHER PUBLICATIONS

International Search Report issued Aug. 21, 2007 in in International Application No. PCT/JP2007/063367.
ANSI/IEEE Std 802.11, 1999 Edition (R2003), "Information technology—Telecommunications and information exchange between systems—Local and metropolitan area networks—Specific requirements," Part 11: Wireless LAN Medium Access Control (MAC) and Physical Layer (PHY) Specifications, Reaffirmed Jun. 12, 2003.
M. Masahiro et al., "Revised version, 802.11 High Speed Wireless LAN Text book," Impress Standard Test Book Series, Impress Communications, pp. 80-83, Jan. 2005, together with a partial English translation.
English versions of the International Preliminary Report on Patentability and the Written Opinion of the International Searching Authority issued Jan. 20, 2009 in International Application No. PCT/JP2007/063367.
Extended European Search Report issued Jul. 22, 2011 in European Application No. 07 76 8125.2.

* cited by examiner

Fig.15

| FREQUENCY BAND | CENTRAL FREQUENCY (GHz) | WIRELESS CHANNEL NUMBER |
|---|---|---|
| F1(5.2 GHz BAND) 5.15~5.25GHz | 5.18 | 36 |
| | 5.20 | 40 |
| | 5.22 | 44 |
| | 5.24 | 48 |
| F2(5.3 GHz BAND) 5.25~5.35GHz | 5.26 | 52 |
| | 5.28 | 56 |
| | 5.30 | 60 |
| | 5.32 | 64 |

Fig.16

| FREQUENCY BAND | CENTRAL FREQUENCY (GHz) | WIRELESS CHANNEL NUMBER |
|---|---|---|
| F3(5.7 GHz BAND) 5.47~5.725GHz | 5.50 | 100 |
| | 5.52 | 104 |
| | 5.54 | 108 |
| | 5.56 | 112 |
| | 5.58 | 116 |
| | 5.60 | 120 |
| | 5.62 | 124 |
| | 5.64 | 128 |
| | 5.66 | 132 |
| | 5.68 | 136 |
| | 5.70 | 140 |
| F4(5.8 GHz) 5.725~5.825GHz | 5.745 | 149 |
| | 5.765 | 153 |
| | 5.785 | 157 |
| | 5.805 | 161 |

WIRELESS COMMUNICATION SYSTEM PROVIDED IN AIRCRAFT FOR COMMUNICATING USING PLURAL WIRELESS CHANNELS

TECHNICAL FIELD

The present invention relates to a wireless communication system provided in a structure such as an aircraft for holding wireless communication using a plurality of wireless channels.

BACKGROUND ART

Conventionally, a wireless communication system using a plurality of wireless stations that includes wireless communication units transmitting and receiving wireless signals, respectively, has been put to practical use. For example, each of Patent Documents 1 and 2 discloses an audio and video data wireless delivery system (the audio and video data will be referred to as an AV data hereinafter) in an aircraft. Patent Document 3 proposes a wireless communication system using a wireless local area network (the local area network will be referred to as a LAN hereinafter) in a vehicle. As a wireless communication unit of the wireless LAN system, the products compliant with the IEEE802.11 standard (See, for example, Non-Patent Document 1), for example, has been put to practical use and marketed. The IEEE802.11 standards contain a plurality of types of standards such as IEEE802.11a, IEEE802.11b, IEEE802.11g, and IEEE802.11n, that are decided according to utilization frequency, transmission method or the like.

As an access control method used in these wireless LAN systems, CSMA/CA (Carrier Sense Multiple Access/Collision Avoidance) has been adopted. With this method, one wireless station detects the radio wave from the other wireless station before transmitting packets from its own wireless station. If the wireless station detects that the other wireless station emits the radio wave, the wireless station withholds from transmitting the radio wave for a certain period of time and checks again whether or not the other wireless station emits the radio wave. If the wireless station detects that the other wireless station does not emit any radio wave, the wireless station transmits the radio wave. Namely, with this method, one wireless station is influenced by the radio wave from the other wireless station. In particular, when a plurality of wireless stations use the same channel, the frequency bands used become completely overlapped on each other. Therefore, such a problem occurs that one wireless station is remarkably influenced by radio waves from the other wireless stations and incapable of transmitting the radio wave from its own wireless station. This eventually attributes to a decrease in effective band and a considerable degradation in communication quality. Concretely, if a plurality of "n" wireless stations in the same channel are present in an interference range, an effective band of each of the wireless stations is probabilistically equal to or narrower than 1/n.

In addition, the IEEE802.11 standards define adjacent channel rejection, which indicates an allowable level of an interference wave of an adjacent channel, namely, at how higher level than that of a channel to be received. If one channel is strongly interfered with an adjacent channel, then a waveform (frequency characteristic) of a received signal changes, and packets cannot be normally received, resulting in packet error. The results attribute to the decrease in effective band and the considerable degradation in communication quality. Non-Patent Document 2 describes the CSMA/CA and the adjacent channel rejection in detail.

FIG. 15 shows frequency bands, central frequencies, and wireless channel numbers of 5 GHz bands (F1 and F2) used according to the IEEE802.11a standard. FIG. 16 shows frequency bands, central frequencies, and wireless channel numbers of 5 GHz bands (F3 and F4) used according to the IEEE802.11a standard. In respective embodiments of the present invention to be described later, a method of allocating wireless channels using frequency bands specified under the IEEE802.11a standard will be described.

Currently, the wireless channels available under the IEEE802.11a standard include the following:

(a) a group of eight continuous channels from the channel 36 to the channel 64;

(b) a group of eleven continuous channels from the channel 100 to the channel 140; and (c) a group of four continuous channels from the channel 149 to the channel 161. Some countries are considering using the wireless channels other than these channels.

It is only in the United States that permitted to use the group (F4) of four continuous channels from the channel 149 to the channel 161. The channels to be currently discussed to be allowed universally all over the world include nineteen channels in all from the channel 36 to the channel 64, and from the channel 100 to the channel 140. In the embodiments of the present invention, an instance of using the channel 36 to the channel 64 will be described by way of example.

In a wireless communication system using the CSMA/CA, it is mainly the same channel interference that influences communications among wireless stations and adjacent channel interference also influences the communications among wireless stations. The same channel interference occurs when, for example, one wireless station uses the channel 36 and the other wireless stations in an interference range uses the same channel 36 in FIGS. 15 and 16. Likewise, the same channel interference occurs when one wireless station uses the channel 40, 44, 48, 56, 60 or 64 and the other wireless stations use the channel of the same number. In addition, the adjacent channel interference occurs in the following cases:

(a) when the channel 40 is used for the channel 36;

(b) when the channels 36 and 44 are used for the channel 40;

(c) when the channels 40 and 48 are used for the channel 44;

(d) when the channels 44 and 52 are used for the channel 48;

(e) when the channels 48 and 56 are used for the channel 52;

(f) when the channels 52 and 60 are used for the channel 56;

(g) when the channels 56 and 64 are used for the channel 60; and (h) when the channel 60 is used for the channel 64.

Patent Document 4 discloses a method of reducing interference among wireless stations. With this method, the different frequency bands are used at least in an adjacent wireless zone interval among the respective wireless zones.

Further, Patent Document 5 discloses a method of preventing interference between a fixed station and a base station. This method is an interference reduction method if cells are present in a range of 180 degrees relative to a specific direction on the horizontal plane. With this method, the different frequencies or polarized waves are used between adjacent sectors of adjacent cells.

Moreover, Patent Document 6 discloses a method of reducing adjacent channel interference. With this method, the mobile stations having almost equal received field intensities are grouped, the wireless signals are transmitted to the grouped mobile stations in a frequency division or time division multiple access, and this leads to reduction in the adjacent channel interference.

In addition, Patent Document 7 discloses a method of reducing interference if, for example, difference systems are present in the same floor or the like. With this method, the frequency channels used by respective systems to be used are classified into a plurality of groups according to the systems, and this leads to preventing from occurrence of interference.

Patent Document 1: Japanese patent laid-open publication No. JP-2006-506899-A.

Patent Document 2: U.S. patent laid-open publication No. 2004/0098745.

Patent Document 3: Pamphlet of International Publication No. WO03/032503.

Patent Document 4: Japanese patent laid-open publication No. JP-7-212828-A.

Patent Document 5: Japanese patent laid-open publication No. JP-2002-112318-A.

Patent Document 6: Japanese patent laid-open publication No. JP-2003-209508-A.

Patent Document 7: Japanese patent laid-open publication No. JP-7-336363-A.

Non-Patent Document 1: ANSI/IEEE Std 802.11, 1999 Edition (R2003), "Information technology—Telecommunications and Information exchange between systems—Local and metropolitan area networks—Specific requirements—Part 11: Wireless LAN Medium Access Control (MAC) and Physical Layer (PHY) Specifications", LAN MAN Standards Committee of the IEEE Computer Society, Reaffirmed on 12 Jun. 2003, IEEE-SA Standards Boards, IEEE (Institute of Electrical and Electronics Engineers, Inc.) Standards Association, [Searched on Jun. 29, 2006], Internet <URL: http://standards.ieee.org/getieee802/802.11.html>.

Non-Patent Document 2: Editorial Supervisors of MATSUE Hideaki et al., "802.11 High-Speed Wireless LAN Textbook", First Edition, IDG Japan, Inc., Mar. 29, 2003.

SUMMARY OF THE INVENTION

However, the above-stated prior arts have the following problems.

With the method of the Patent Document 4, an adjacent channel is often present in an adjacent wireless zone interval. That is, one channel may possibly suffer the adjacent channel interference directly from the adjacent zone without wireless reduction. Further, even if the same channels are not present in the adjacent wireless zone interval, the distance between the same channels is closer and radio wave interference may occur from the same channels when a range of each zone is narrow.

In addition, the method of the Patent Document 5 is effective only for a limited case in which cells are present in the range of 180 degrees with respect to the specific direction on the horizontal plane. Besides, because of use of polarized waves, is reflected waves having various planes of polarization are present particularly in a space (such as an aircraft) in which complicated reflected waves are mixed. Moreover, even if adjacent sectors use different frequencies, the sectors suffer radio wave interference from the same channels because of, for example, the small distance between the same channels in a manner similar to that of the Patent Document 4.

The method of the Patent Document 6 includes a step of deciding frequencies of mobile stations, and is not intended to reduce interference between base stations. In addition, the method of the Patent Document 6 needs to measure received intensities, include determination means, and perform time-division transmission, disadvantageously resulting in complicated configuration.

The method of the Patent Document 7 relates to a mechanism of eliminating use of the same channels and does not relate to eliminate interference between the same channels, accordingly. In addition, since the adjacent channels belong to the same group, interference disadvantageously occurs.

Moreover, according to the prior arts, in a space such as an aircraft, surrounded by a frame body made of metal having high reflectivity for radio wave, the probability of emitting radio waves to outside is low, and radio waves are constrained to be in the aircraft. As a result, the radio wave interference tends to occur due to the reflected waves and the interference reduction effect cannot be obtained only by the zoning mechanism and the polarized waves.

It is an object of the present invention to provide a wireless communication system and a wireless channel allocation method for use in the wireless communication system, capable of solving the above-mentioned problems and reducing interference between the same channels and interference between the adjacent channels using features of a structure.

Means for Solving the Problems

According to the first aspect of the present invention, there is provided a wireless communication system including a plurality of wireless stations provided in a structure having a radio wave shield arranged at a fixed position. In the wireless communication system, at least one of two wireless stations using an identical wireless channel and two wireless stations using wireless channels adjacent to each other are allocated on both sides of the radio wave shield, respectively.

In the wireless communication system, the structure is an aircraft, and the two wireless stations are allocated on different aisles of the aircraft, respectively.

In addition, in the wireless communication system, the two wireless stations are allocated to be apart from each other in a longitudinal direction of the aircraft.

Further, in the wireless communication system, the two wireless stations are allocated to put a wireless station using a wireless channel belonging to a wireless channel group different from a wireless channel group of the identical wireless channel and the adjacent wireless channels, between the two wireless stations.

Still further, in the wireless communication system, each of the wireless stations includes a radiation pattern having a main beam in a direction substantially parallel to a width direction of the aircraft.

According to the second aspect of the present invention, there is provided a wireless channel allocation method for use in a wireless communication system including a plurality of wireless stations provided in an aircraft having a radio wave shield arranged at a fixed position. The wireless channel allocation method includes the steps of allocating at least one of two wireless stations using an identical wireless channel and two wireless stations using wireless channels adjacent to each other on both sides of the radio wave shield, respectively; and allocating the two wireless stations on different aisles of the aircraft, respectively.

The wireless channel allocation method further includes a step of allocating the two wireless stations to be apart from each other in a longitudinal direction of the aircraft.

In addition, the wireless channel allocation method further includes a step of allocating the two wireless stations to put a wireless station using a wireless channel belonging to a wireless channel group different from a wireless channel group of the identical wireless channel and the adjacent wireless channels, between the two wireless stations.

Further, in the wireless channel allocation method, each of the wireless stations includes a radiation pattern having a main beam in a direction substantially parallel to a width direction of the aircraft.

According to the wireless communication system and the wireless channel allocation method of the present invention, wireless channels that are the same channels and/or adjacent channels are allocated to put the radio wave shields between the channels. More preferably, two wireless stations using the identical wireless channel and/or adjacent wireless channels are allocated on different aisles of the aircraft, respectively, and this leads to reduction in the radio waves arriving at the mutual wireless stations between the channels. Due to this, the interference between the channels is reduced, and the mechanism of transmission waiting is suppressed from functioning. Further, wireless packet errors caused by the radio wave interference are reduced, and this leads to that the wireless band can be effectively used. As a result, it is possible to guarantee wideband and high-quality wireless transmission.

The wireless channel allocation method and the wireless communication system according to the present invention do not need communication procedures for detecting the radio waves and reducing interference but can be realized by a simple apparatus without need of control circuits, software, and the like.

BRIEF DESCRIPTION OF THE DRAWINGS

FIG. 15 shows frequency bands, central frequencies, and wireless channel numbers of 5 GHz bands (F1 and F2) used according to the IEEE802.11 a standard.

FIG. 16 shows frequency bands, central frequencies, and wireless channel numbers of 5 GHz bands (F3 and F4) used according to the IEEE802.11a standard.

DETAILED DESCRIPTION OF THE INVENTION

Embodiments according to the present invention will be described hereinafter with reference to the drawings. In the embodiments to be described below, similar components are denoted by the same reference symbols. In the embodiments, an example of an AV data wireless delivery system that is a so-called entertainment system using a wireless LAN system in an aircraft will be described.

Figure 8:
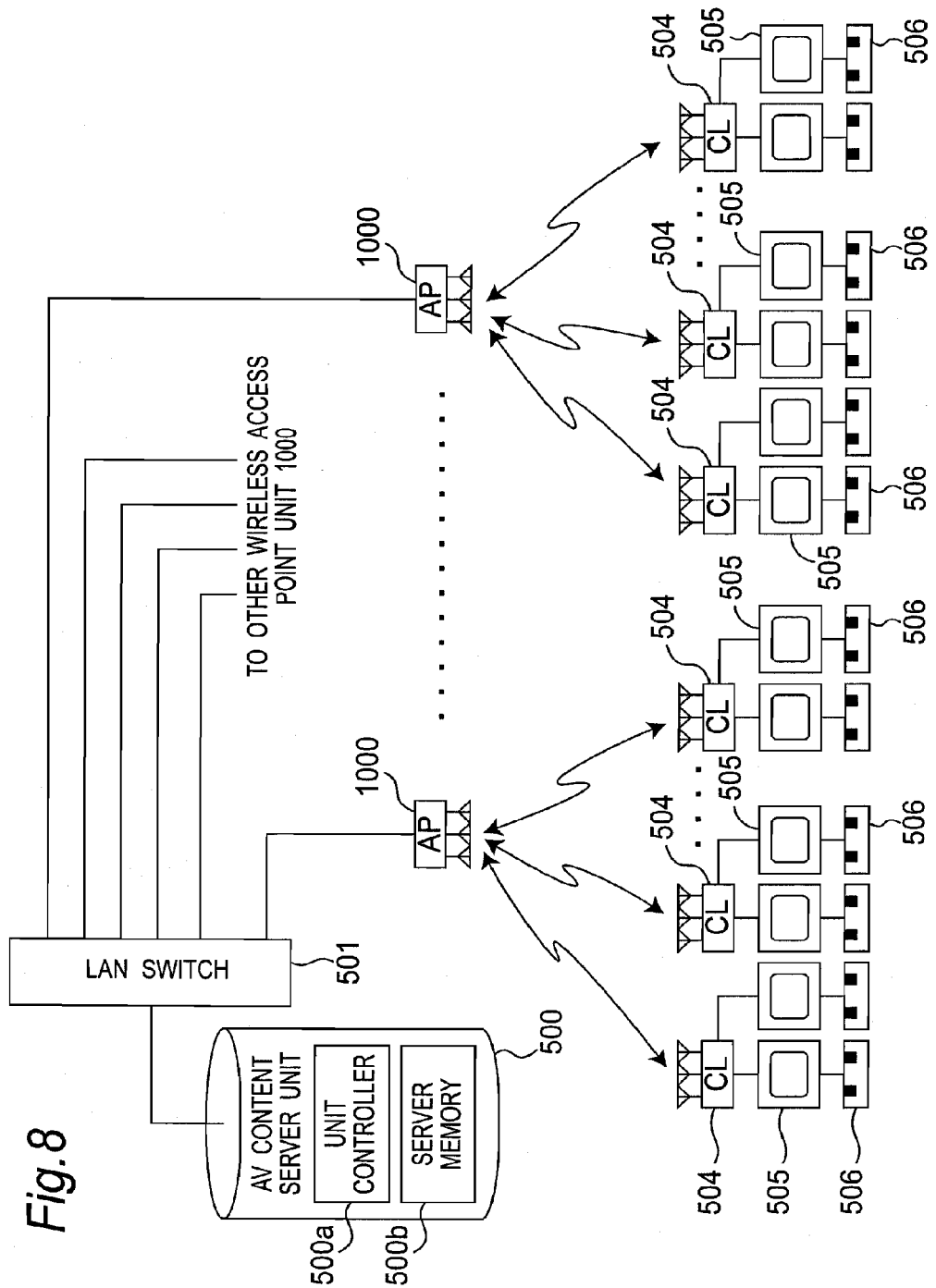
FIG. 8 is a block diagram showing a unit configuration of the AV data wireless delivery system according to the embodiments of the present invention.

FIG. 8 is a block diagram showing a unit configuration of the AV data wireless delivery system according to the embodiments of the present invention. Referring to FIG. 8, the AV data wireless delivery system is configured to include the following:

(a) an AV content server unit 500 configured to include a unit controller 500a and a server memory 500b for storing therein AV content data;

(b) a LAN switch 501 such as an Ethernet (registered trademark) switch, connected to the AV content server unit 500 via a LAN cable;

(c) a plurality of wireless access point units 1000 connected to the LAN switch 501 via LAN cables; and (d) a plurality of wireless client devices 504 wirelessly connected to the respective wireless access point units 1000 and each including video monitor devices 505 for serving as output devices and a user controller 506 for serving as an input device.

Figure 9:
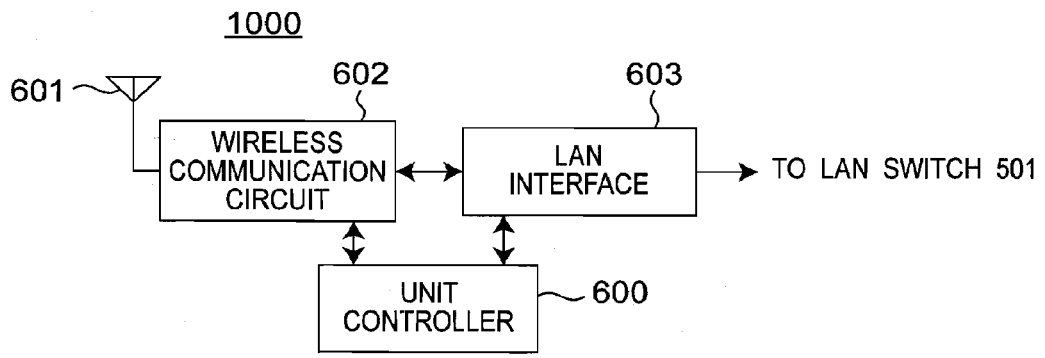
FIG. 9 is a block diagram showing a configuration of each wireless access point unit 1000 shown in FIG. 8.

FIG. 9 is a block diagram showing a configuration of each wireless access point unit 1000 shown in FIG. 8. Referring to FIG. 9, the wireless access point unit 1000 is configured to include an antenna 601 for transmitting and receiving wireless signals from the wireless client device 504, a wireless communication circuit 602, a LAN interface 603 connected to the LAN switch 603, and a unit controller 600 for controlling operations of these circuits 602 and 603.

Figure 10:
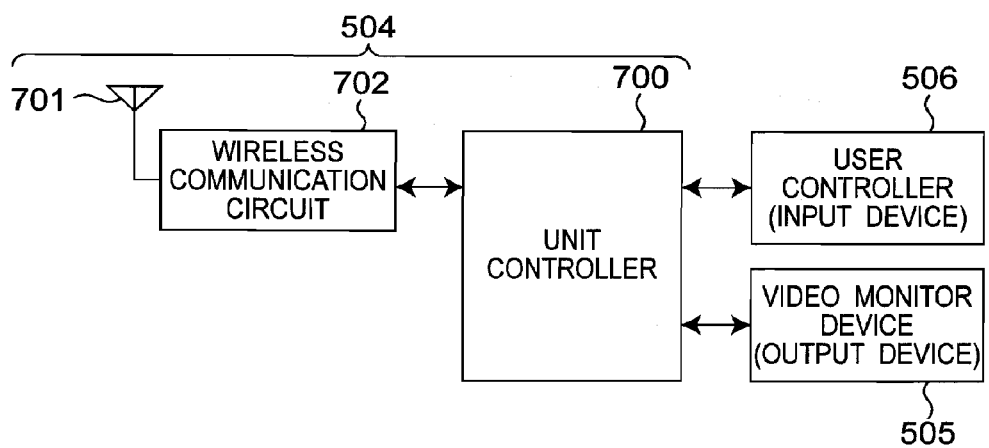
FIG. 10 is a block diagram showing a configuration of each wireless client device 504 shown in FIG. 8.

FIG. 10 is a block diagram showing a configuration of each wireless client device 504 shown in FIG. 8. Referring to FIG. 10, the wireless client device 504 is configured to include an antenna 701 for transmitting and receiving the wireless signal from the wireless access point unit 1000, a wireless communication circuit 702, and a unit controller 700 for controlling the operation of the wireless communication circuit 702. In this case, the video monitor devices 505 each for serving as the output device for causing a passenger who is a user to view and listen to contents or the like, and the user controller 506 serving as the input device for causing the passenger to input instruction information or the like are connected to the unit controller 700.

A message signal inputted by the passenger using the user controller 506 and including a request is transmitted to the AV content server unit 500 via the wireless access point unit 1000 and the LAN switch 501. The AV content server unit 500 delivers AV data to the wireless client device 504 in a streaming form in response to the message signal. Namely, the AV data is transmitted to the wireless client device 504, which is to receive the AV data, via the LAN switch 501 and the wireless access point unit 1000, and is then outputted to the video monitor device 505 of the passenger, and this leads to that the passenger can view and listen to the images of the desired video program.

In the embodiment shown in FIG. 8, two video monitor devices 505 are connected to one wireless client device 504. However, the present invention is not limited to this. One or three or more video monitor devices 505 may be connected to one wireless client device 504. It is to be noted that a headphone (not shown) is connected to each video monitor device 505, so that the passenger can listen to speech or voice corresponding to an image signal of the video program. In addition, the passenger can receive only audio signals and enjoy, for example, only music.

Next, the wireless transmission system will be described. One or a plurality of wireless client devices 504 is connected to one wireless access point unit 1000. Each of these wireless client devices 504 connected to the wireless access point unit 1000 performs a wireless communication with the wireless access point unit 1000 using one wireless channel. A group of the wireless access point unit 1000 and the wireless client devices 504 constituted by one wireless channel is referred to as a "wireless cell". A plurality of wireless access point units 1000 is allocated in an aircraft. That is, a plurality of wireless cells is present in the aircraft.

Figure 1:
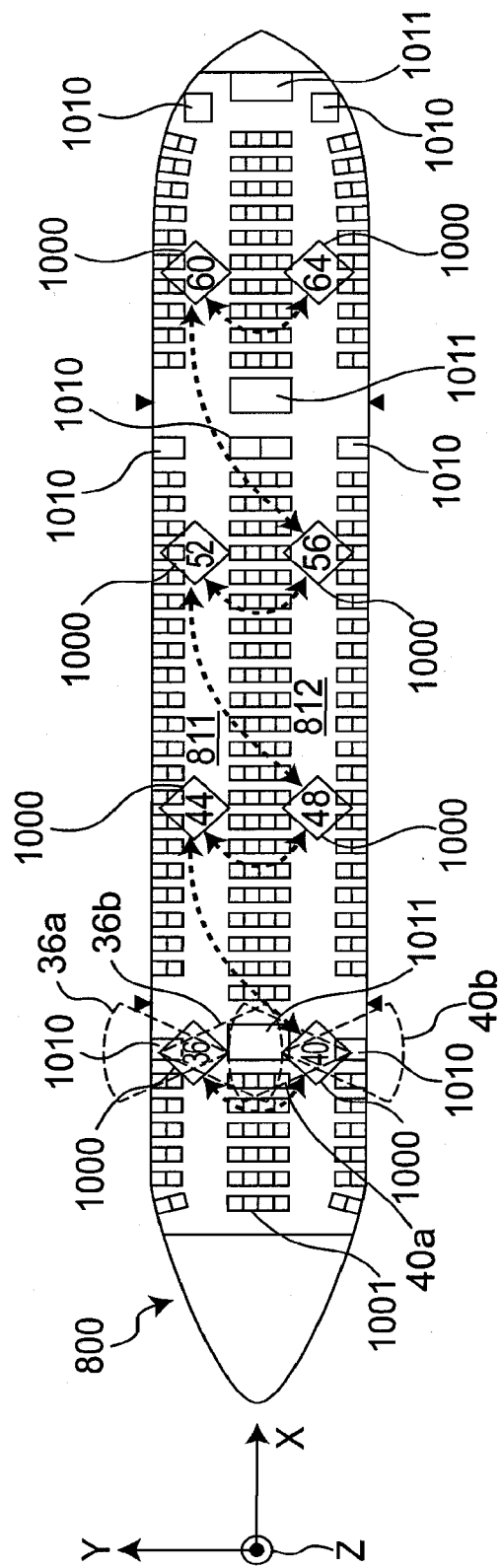
FIG. 1 is a cross-sectional view showing an AV data wireless delivery system that is a so-called in-aircraft entertainment system including a plurality of wireless access point units 1000 allocated in an aircraft 800, and showing a first allocation example of wireless channels of the respective wireless access point units 1000 according to the first embodiment of the present invention.
Figure 11:
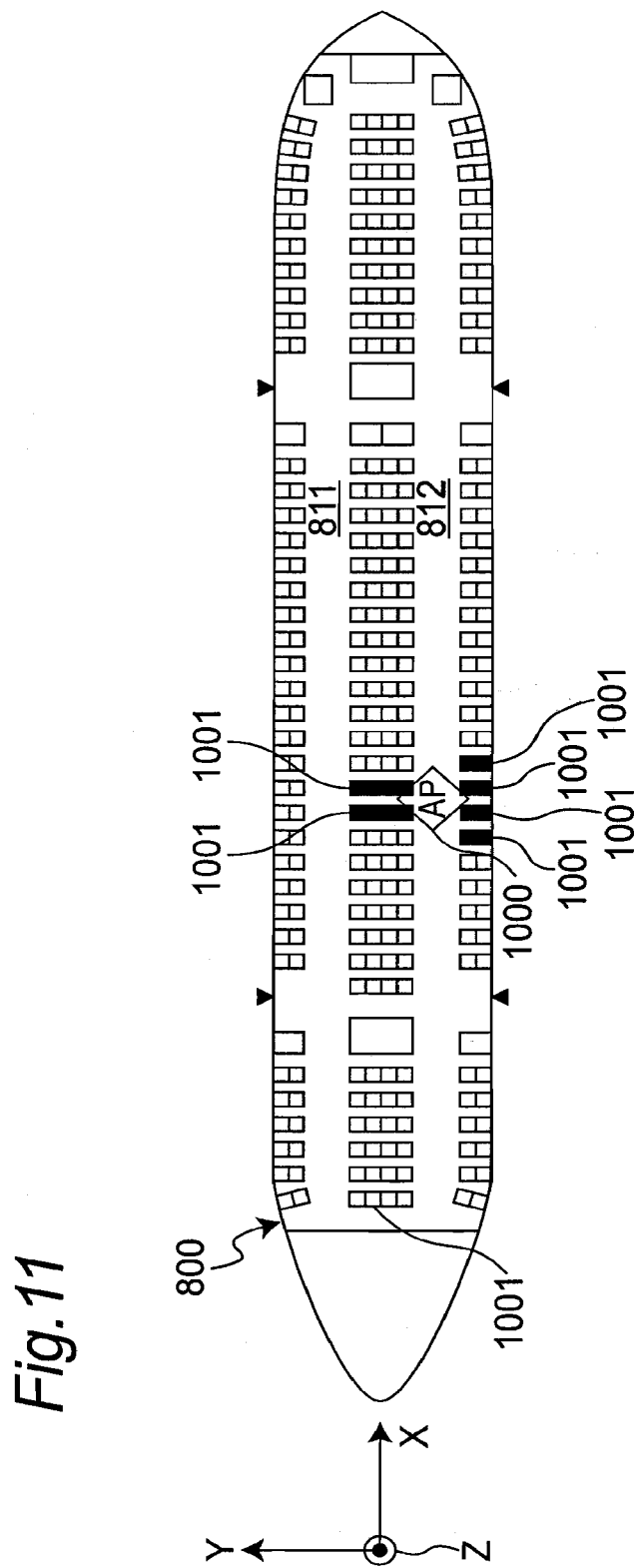
FIG. 11 is a cross-sectional view showing the wireless cells of the wireless access point units 1000 shown in FIG. 1.

FIG. 11 is a cross-sectional view showing the wireless cells of the wireless access point units 1000 shown in FIG. 1. In FIG. 11, it is defined that a longitudinal direction of an aircraft 800, namely, a cross direction (or forward and backward directions) is an X direction and that a width direction of the aircraft 800 is a Y direction. In FIG. 11, 1001 denotes a seat of the aircraft, and 1000 denotes the wireless access point unit. Referring to FIG. 11, only one wireless cell is shown, and the seats 1001 filled with black are a group of seats connected to the wireless access point unit 1000. In the example of FIG. 11, an instance of four two-row seat groups and two four-row seat groups is shown. One wireless client device 504 is attached to each row of seats. As the groups of seats covered by the wireless access point unit 1000, groups of seats to which signals can be wirelessly transmitted by stronger radio waves so as to ensure stable transmission and which are located near the wireless access point unit 1000 are selected. These groups of seats and the wireless access point unit 1000 constitute one wireless cell and perform wireless transmission using one wireless channel.

Generally speaking, the antenna 601 having a directivity characteristic that fewer radio waves are radiated in the cross direction (or the forward and backward directions) of the aircraft (X direction) is used so as to transmit strong radio waves into the wireless cell and minimize radiation of the radio waves particularly in the cross direction of the aircraft (X direction). A radiation pattern of the antenna 601 is shown in, for example, FIG. 1. In FIG. 1, the number in the square of each wireless access point unit 1000 denotes a wireless channel number. The same thing is true for the other drawings than FIG. 1. The wireless client device 504 using the channel 36 includes the radiation pattern 36*a*, for example, generally sector-shaped and having the main beam in the Y direction and the radiation pattern 36*b*, for example, generally sector-shaped and having the main beam in the −Y direction. In addition, the wireless client device 504 using the channel 40 includes the radiation pattern 36*a*, for example, generally sector-shaped and having the main beam in the Y direction and the radiation pattern 36*b*, for example, generally sector-shaped and having the main beam in the −Y direction.

The present invention is intended to minimize wireless interference, namely, to minimize the radio waves from the other wireless client devices 504 using the channels that interfere with a wireless station (channel) of one wireless client device 504. To this end, the following two methods have been considered.

The first method is the method of locating the respective wireless stations apart from one another. This method is basically effective way in the aircraft. However, since an airframe of the aircraft 800 is a closed space made of a radio wave reflecting body such as metal, it is difficult to release reflected waves to outside thereof, and the effect of the method is restricted. Moreover, it is not guaranteed that the method can be effectively adapted to all the channels if a large number of wireless access point units 1000 are used or for allocation of the wireless stations according to a required band of the AV data wireless delivery system.

The second method is to make it difficult for the radio waves to arrive at the other wireless stations by arranging the radio wave shields between the wireless stations interfering with each other. By arranging the radio wave shields, it is possible to reduce the radio waves from the other wireless station and eventually reduce interference between the channels.

According to the present invention, attention is paid to this respect, and the interference between the channels is reduced by using the radio wave shields using structural features of the aircraft 800. Examples of the radio wave shield include not only a matter or material having a high radio wave absorption such as a radio wave shielding sheet absorbing and attenuating the radio waves, a cushion material, a liquid, and a human body, but also a matter or material reflecting the radio wave from a radiation direction (traveling direction) of the radio wave from the antenna by metal reflection or the like, changing the direction of the radio wave, preventing the radio wave from directly arriving at the other wireless stations, so as to substantially shield the radio wave. The reflection by these matters becomes diffused reflection, and therefore, whenever reflection is repeated, the radio wave weakens and has a less influence as an interference source.

First Embodiment

In a first embodiment of the present invention, a method of reducing the adjacent channel interference will be described. FIG. 1 is a cross-sectional view showing an AV data wireless delivery system that is a so-called aircraft entertainment system including a plurality of wireless access point units 1000 allocated in an aircraft 800, and showing a first allocation example of wireless channels of the respective wireless access point units 1000 according to the first embodiment of the present invention. The important point of the present embodiment is that wireless client devices 504 using adjacent channels are allocated in different aisles 811 and 812, respectively, and that the influence of interference is eliminated by the radio wave shields between the aisles 811 and 812. The two aisles 811 and 812 of the aircraft 800 shown in FIG. 1 extend in the longitudinal direction (X direction) of the aircraft, and are in parallel to each other.

Referring to FIG. 1, each of the wireless access point units 1000 is denoted by a diamond, and a wireless channel number is written in the diamond. In addition, FIG. 1 shows an instance of four-row seat groups and two-row seat groups, and the four-row seat groups are allocated at the center of an airframe and the two-row seat groups are allocated by both windows. Moreover, a metal washstand and the like are furnished in a lavatory 1010. Galleys (kitchens in the aircraft) 1011 are places where dishes and drinks are prepared to be served and where metal carts and the like for carrying dishes and drinks are arranged. Needless to say, storages for dishes and drinks are present in the galleys 1011.

Figure 2:
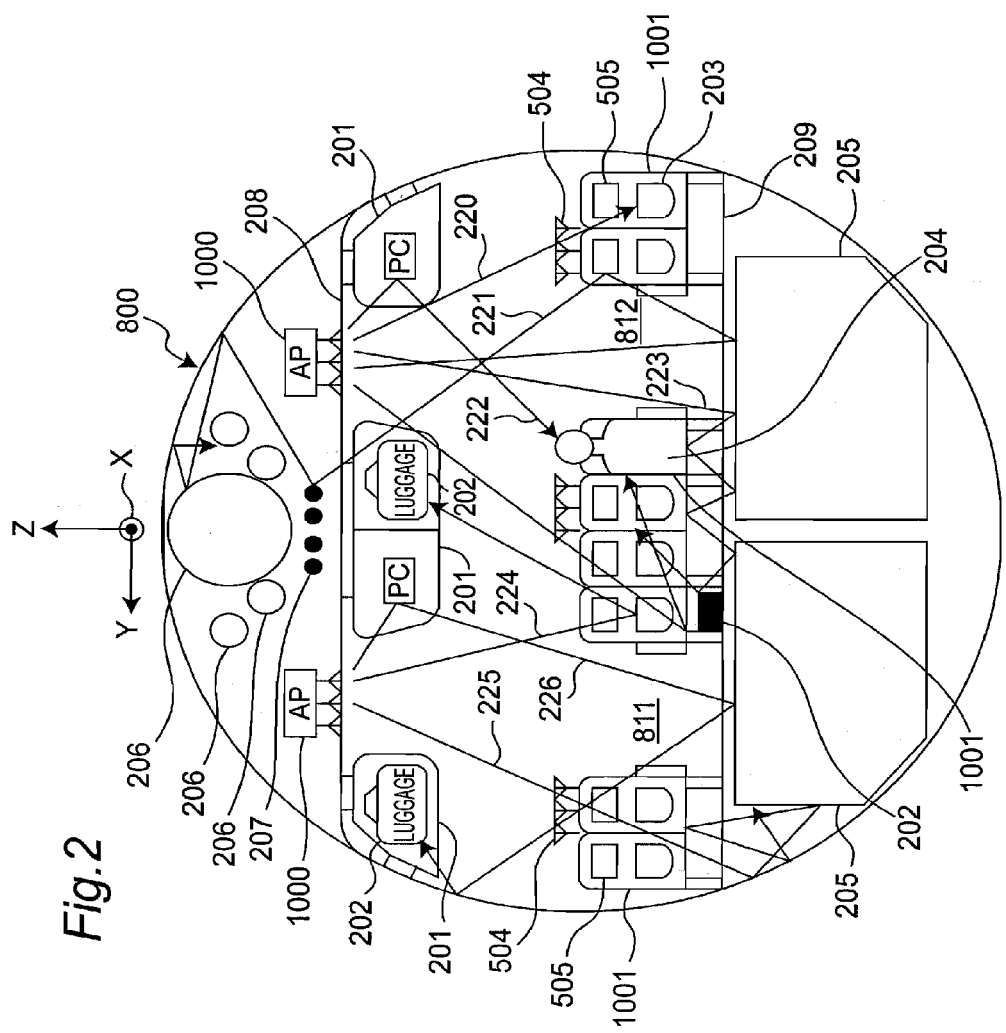
FIG. 2 is a longitudinal sectional view showing reflection states of wireless signals from the respective wireless access point units 1000 near seats 1001 of the aircraft 800 shown in FIG. 1.

FIG. 2 is a longitudinal sectional view showing reflection states of wireless signals from the respective wireless access point units 1000 near seats 1001 of the aircraft 800 shown in FIG. 1, and FIG. 2 is a longitudinal sectional view taken along a line parallel to the width direction (Y direction) of the aircraft 800. Referring to FIG. 2, the respective wireless access point units 1000, the seats 1001, wireless client devices 504, and video monitors 505 are provided in a manner similar to those of FIGS. 1 and 8. Further, a user controller 506 is arranged in a part of each seat 1001 although it is not shown in FIG. 2.

Passenger luggage storages 201 are arranged at total four locations including two locations at upper portions of seats on the both window sides and two locations at an upper portion of central seats. This is a standard configuration of the aircraft 800 having the two aisles 811 and 812. Pieces of passenger's luggage 202 which passengers carry on the aircraft are first stored in the passenger luggage storages 201, and those which are not stored in the passenger luggage storages 201 are strongly recommended to be put under the respective seats for safety navigation of the aircraft. A passenger glove compartment 203 is normally furnished in a rear portion of the seat of a front passenger. Each passenger can put his or her carry-on luggage in the glove compartment in a manner similar to that under the seat 1001. In addition, each passenger 204 is generally always seated in the seat 1001. Normally, the passenger 204 is seated on the front surface of the seat 1001, and the video monitor device 505 and the passenger glove compartment 203 are attached to a rear surface of a backrest of the seat 1001. For convenience of the drawings, FIG. 2 shows the passenger 204, the video monitor device 505, and the passenger glove compartment 203 in the same plane. Since the radio wave of each wireless signal is radiated three-dimensionally, the above-stated illustration on the two-dimensional drawing does not hamper substantial description.

Moreover, a cargo compartment 205 is arranged at a predetermined position of the aircraft 800 (normally under the floor of a passenger compartment). Pieces of luggage having checked by the passengers 204, goods and the like are put in containers made of duralumin or the like and stored in the cargo compartment 205. Piping 206 in the aircraft includes pipes for passing through oxygen to be fed into oxygen masks in emergency, oxygen tanks (not shown) filled with oxygen, wires for moving wings, wires for moving doors, pipes for protecting navigation control wirings or the like, etc. Wires 207 include metal wirings and control wires or the like for control of directly irrelevant to navigation safety and some of the wires 207 are not protected with pipes. The wires 207 particularly heavy and made of materials such as metal are arranged at the center of the airframe of the aircraft as much as possible to keep balance between left and right with views of safety navigation of the aircraft 800.

The wireless access point units 1000 are normally allocated in the ceiling above the respective aisles 811 and 812. The reason is as follows. Because of allocation of the wireless client devices 504 on the respective seats 1001, if the wireless access point units 1000 are allocated, for example, above the passenger luggage storage 201, the radio waves are radiated and promptly reflected or absorbed by the pieces of luggage of the passengers 204. As a result, the radio waves arriving at the respective wireless client devices 504 to which the strong radio waves are supposed to be transmitted become weak, and the communication quality cannot be ensured. That is, in directions to the wireless client devices 504 directly from each of the wireless access point units 1000, it is ideal that no radio wave shield is present so as to ensure strong radio waves. That is why it is an ideal allocation of the wireless access point units 1000 in the ceiling above the respective aisles 811 and 812.

In addition, it is unpreferable that the passenger compartment of the aircraft 800 has protrusions for safety reasons. In this respect, the wireless access point units 1000 are ideally allocated in the ceiling. If no problem occurs when the wireless access point units 1000 are allocated in the passenger compartment or strong radio waves arrive at the wireless client devices 504, the wireless access point units 1000 may be allocated below the ceiling (passenger compartment side), above or below the aisles 811 and 812 or the like. For example, if the aircraft 800 is, for example, a double-decked aircraft, one wireless access point unit 1000 can cover the wireless client devices 504 in a lower lounge and an upper lounge by providing the wireless access point units 1000 immediately beneath the aisles in the upper lounge or immediately above the aisles in the lower lounge.

As for the allocation of the wireless client devices 504, the wireless client devices 504 are allocated above the aisles 811 and 812 so as to receive waves directly from the wireless access point units 1000 in FIG. 2. Alternatively, the wireless client devices 504 may be allocated below the aisles 811 and 812. In this case, the wireless client devices 504 can stably receive the radio waves leaking from the seats 1001 or strong first reflected waves reflected by the cargoes or the like, so that the wireless client devices 504 may be allocated below the respective aisles 811 and 812.

Figure 4:
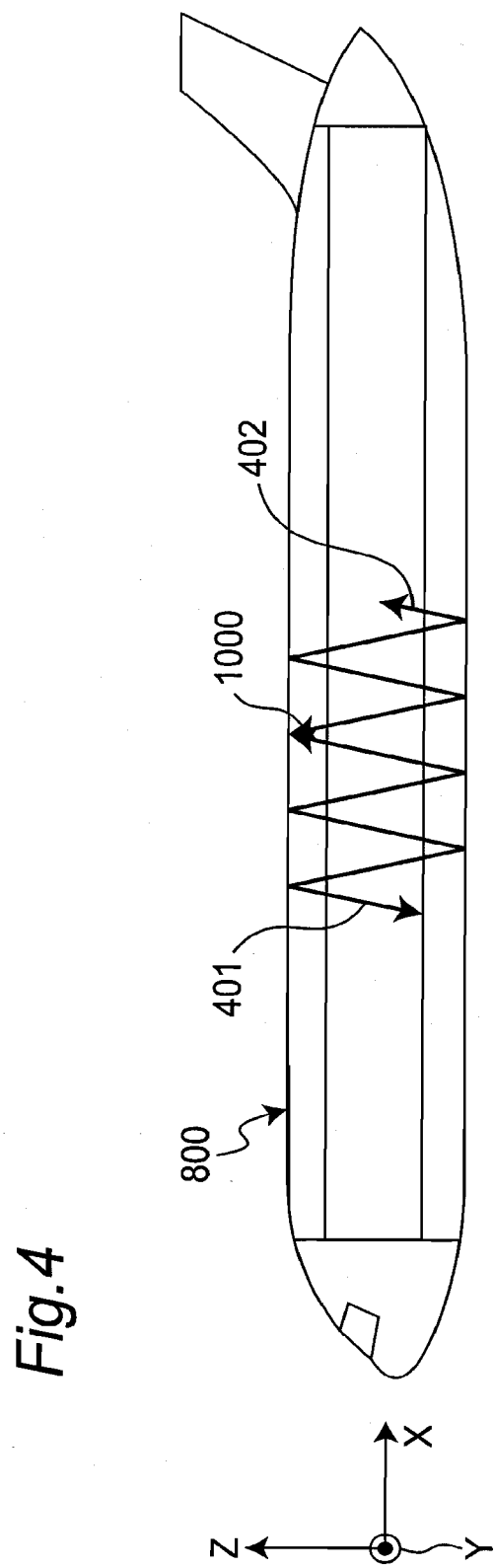
FIG. 4 is a longitudinal sectional view showing such a state that wireless signals transmitted from the wireless access point units 1000 shown in FIG. 1 are repeatedly reflected in an upper portion or a lower portion of the airframe of the aircraft 800 and propagated in the cross direction (X direction) of the aircraft 800.

FIG. 4 is a longitudinal sectional view showing such a state that the wireless signals transmitted from the wireless access point units 1000 shown in FIG. 1 are repeatedly reflected in an upper portion or a lower portion of the airframe of the aircraft 800 and propagated in the cross direction (X direction) of the aircraft 800. FIG. 4 is a longitudinal sectional view taken along a line parallel to the longitudinal direction of the aircraft 800. Referring to FIG. 4, a wireless signal transmitted from one wireless access point unit 1000 allocated, for example, in the ceiling of the aisles 811 and 812 is repeatedly reflected in the airframe and arrives not only in the width direction (Y direction) but also in the cross direction (X direction) of the aircraft 800. As already described with reference to FIG. 11, one wireless access point unit 1000 covers a plurality of seats 1001 in the cross direction (X direction) of the aircraft 800. Therefore, it is necessary that no radio wave shield is present in the direction in which the radio waves are radiated from the wireless access point unit 1000. In this context, the wireless access point units 1000 are ideally allocated in the ceiling above the respective aisles 811 and 812 as shown in FIG. 2. The radio waves are frequently reflected in the airframe and in an environment in which the radio waves tend to be propagated to distant locations, accordingly. However, since the radio waves are weak inversely proportionally to the cube of a distance, the state of the radio waves are eventually equivalent to such a state that no radio wave is present substantially as indicated by 401 and 402 shown in FIG. 4. Needless to say, the distance by which the radio waves turn into this state depends on a reflection state.

Referring next to FIG. 2, a manner in which above-stated constituent elements shield the wireless signals will be described. In the following description, the wireless signals are described using "reflection" and "absorption". However, it does not necessarily mean that the wireless signals are reflected or absorbed. The reflectivity and absorptance depend on the matter or material. For example, the matter or material reflects 80% and absorbs 20% or reflects 30% and absorbs 70%. In this way, the reflectivity and absorptance change depending on the matter or material, and are concerns to that degree. Accordingly, the terms "reflection" and "absorption" are simply used for the convenience of description and mean the same in the sense of "preventing (shielding) progress of wireless signals" of substantial relevance to the present invention. Moreover, in the following description, an expression of "radio wave disappears" is used. The radio wave does not disappear until it is completely absorbed by some sort of the matter or material. However, if the level (or intensity) of the radio wave is equal to or smaller than the detection level (or intensity) of the wireless unit or equal to or smaller than a level at which the radio wave has an influence of interference, the radio wave is considered to substantially disappear from viewpoints of the present invention. That is why the term "disappear" is used.

Referring to FIG. 2, the components in the aircraft will be described from viewpoints of the reflection and absorption of the radio waves. The passenger's carry-on luggage is stored in the passenger luggage storages 201, the passenger carry-on luggage 202, and the passenger glove compartments 203. Examples of pieces of the luggage include a notebook personal computer (PC). A housing, a board or the like of the personal computer reflects a wireless signal. In addition, clothing such as clothes, an alcoholic beverage, and a liquid such as a juice or water absorb the radio waves. It has been known that the human body of the passenger 204 absorbs wireless signals. Moreover, the clothes which the passenger wears, blankets used in the aircraft, and the like absorb wireless signals. Further, a cushion material absorbing wireless signals is used for the seats 1001. The backrest of each seat 1001 and a framework of the seat such as a bottom plate are made of such metal as duralumin or a carbon-composite material partially reflecting or partially absorbing wireless signals.

Moreover, as stated above, the cargo 205 is made of duralumin and reflects wireless signals. Even if the cargo compartment 205 is made of a material transmitting wireless signals in future, the luggage stored in the cargo compartment 205 is substantially similar to that stored in the passenger luggage storages or the like, which luggage is made of matters absorbing or reflecting wireless signals. The piping 206 in the aircraft and the wires 207 reflect wireless signals. The housings and the like of the respective units of the AV data wireless delivery system in the aircraft 800 including the wireless access point units 1000 shown in FIG. 11 also reflect wireless signals. Since a passenger compartment ceiling 208 and a passenger compartment floor 209 are made of paper or the like reinforced by a honeycomb structure for weight saving of the airframe, the passenger compartment ceiling 208 and the passenger compartment floor 209 transmit wireless signals.

Referring to FIG. 2, the manner of shielding wireless signals will be next described concretely. A wireless signal 220 is transmitted from one of the wireless access point units 1000, and is received by one of the wireless client devices 504. Thereafter, the radio wave of the wireless signal 220 is absorbed by the radio wave absorbers such as plastic bottles put in the cushion of one of the seats 1001 and in the passenger glove compartment 203 of the seat 1001, and the same radio wave disappears. In addition, a wireless signal 221 is transmitted from the wireless access point unit 1000, is reflected by the cargo 205, is reflected by one of the video monitors 505, is reflected by one of the wires 207, is reflected by the airframe, is reflected by the piping 206 in the aircraft, and is reflected by the airframe. Since the propagation distance becomes long, the radio wave of the wireless signal 221 disappears. Moreover, a wireless signal 222 is transmitted from the wireless access point unit 1000, is reflected by a PC(Personal Computer) in one of the passenger luggage storages 201, and is absorbed by the human body of the passenger 204, the radio wave thereof disappears.

A wireless signal 223 is transmitted from the wireless access point unit 1000, is reflected by the cargo 205, is repeatedly reflected by the duralumin bottom plates on bottoms of the seats 1001 and the cargo 205, is reflected by the passenger carry-on luggage 202, and is absorbed by the cushion of one of the seats 1001, the radio wave thereof disappears. A wireless signal 224 is transmitted from one of the wireless access point units 1000, is reflected by a passenger carry-on luggage such as a portable audio set in one of the passenger glove compartments 203, and is absorbed by, for example, a drink in the pieces of the luggage in the passenger luggage compartments 201, the radio wave thereof disappears.

Moreover, a wireless signal 225 is transmitted from one of the wireless access point units 1000, is received by one of the wireless client devices 504, and then, is reflected by the airframe. Thereafter, the wireless signal 225 is repeatedly reflected by the cargo 205 and the duralumin bottom plates on bottoms of the seats 1001, and the radio wave thereof disappears since the propagation distance becomes long by the repeated reflection. In addition, a wireless signal 226 is transmitted from the wireless access point unit 1000, is reflected by a PC(Personal Computer) in one of the passenger luggage storages 201, is reflected by the cargo 205, is received by one of the wireless client devices 504, is reflected by the airframe, and is absorbed by, for example, clothes of pieces of passenger luggage in the passenger luggage storage 201, the radio wave thereof disappears.

In FIG. 2, the arrows indicating that radio waves pass above the matters or materials described to reflect the radio waves are often shown. However, they are shown because of two-dimensional illustration, and actual reflection occurs in three dimensions and such a case exists. In addition, the radio wave is reflected diffusely in complicated manners in a plurality of directions by one reflection. Due to this, if attention should be paid to a specific reflection direction as shown in FIG. 2, the reflected wave is quite weak.

Figure 3:
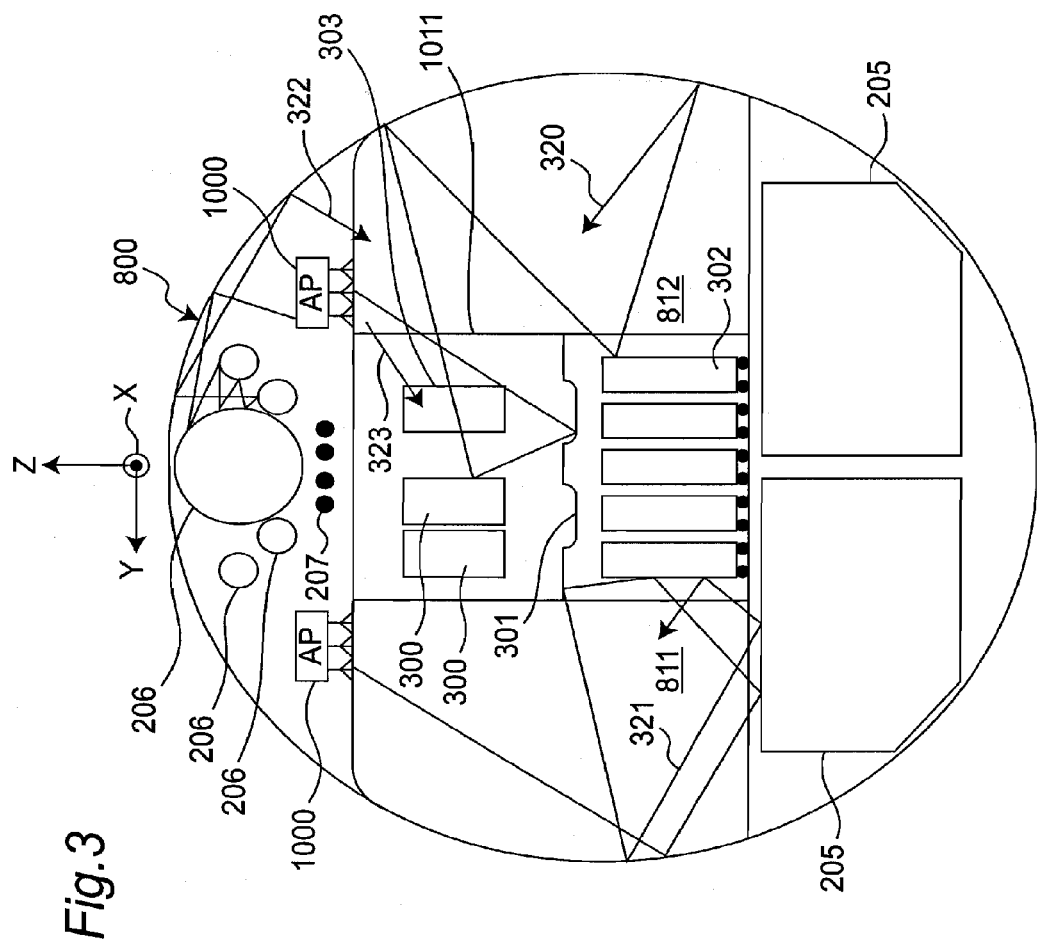
FIG. 3 is a longitudinal sectional view showing such a state that wireless signals from the respective wireless access point units 1000 are reflected and propagated near one of the galleys 1011 of the aircraft 800 shown in FIG. 1.

FIG. 3 is a longitudinal sectional view showing such a state that the wireless signals from the respective wireless access point units 1000 are reflected and propagated near one of the galleys 1011 of the aircraft 800 shown in FIG. 1.

Referring to FIG. 3, the reflection of wireless signals by the galley 1011 will be described. In FIG. 3, 300 denotes a coffee server device, 301 denotes a sink, and 302 denotes a cart for carrying dishes and drinks. All of these are made mainly of metal, have quite high radio reflectivity, and are often ensured to have heat resistance by the metal in a manner similar to that of the wall, the floor, the ceiling and the like since the structure of the galley 1011 deals with high temperature matters per se. The drinks to be served to the passengers are stored in a drink storage 303. Since the drinks are liquid, they absorb the radio waves.

Next, referring to FIG. 3, a manner of shielding wireless signals will be described concretely. As shown in FIG. 3, a wireless signal 320 is transmitted from one of the wireless access point units 1000. While the wireless signal 320 is reflected by the sink 301, one of the coffee server devices 300, the aircraft body, the cart 302, and the airframe, the propagation distance of the radio wave becomes long, and the radio wave of the wireless signal 320 disappears. In addition, a wireless signal 321 is transmitted from one of the wireless access point units 1000. While the wireless signal 321 is repeatedly reflected by the airframe, the cargo 205, the cart 302, the sink 301, the aircraft body, the cargo 205, and the cart 302, the propagation distance of the radio wave becomes long, and the radio wave of the wireless signal 321 disappears. Further, a wireless signal 322 is transmitted from one of the wireless access point units 1000. While the wireless signal 322 is repeatedly reflected by the airframe and the piping 206 in the aircraft, the propagation distance of the radio wave becomes long, and the radio wave of the wireless signal 322 disappears. As indicated by the wireless signal 322, a part of the radio waves are often emitted upward from the wireless access point units 1000. Still further, a wireless signal 323 is transmitted from one of the wireless access point units 1000, and the radio wave of the wireless signal 323 is absorbed by the liquid such as juice in the drink storage 303 and disappears.

FIGS. 2 and 3 show the reflection by the seats 1001 and by the galley 1011 as two-dimensional pattern diagrams. However, reflection actually occurs in three dimensions, so that the reflection by the seats 1001 and that by the galley 1011 are often combined.

Figure 5:
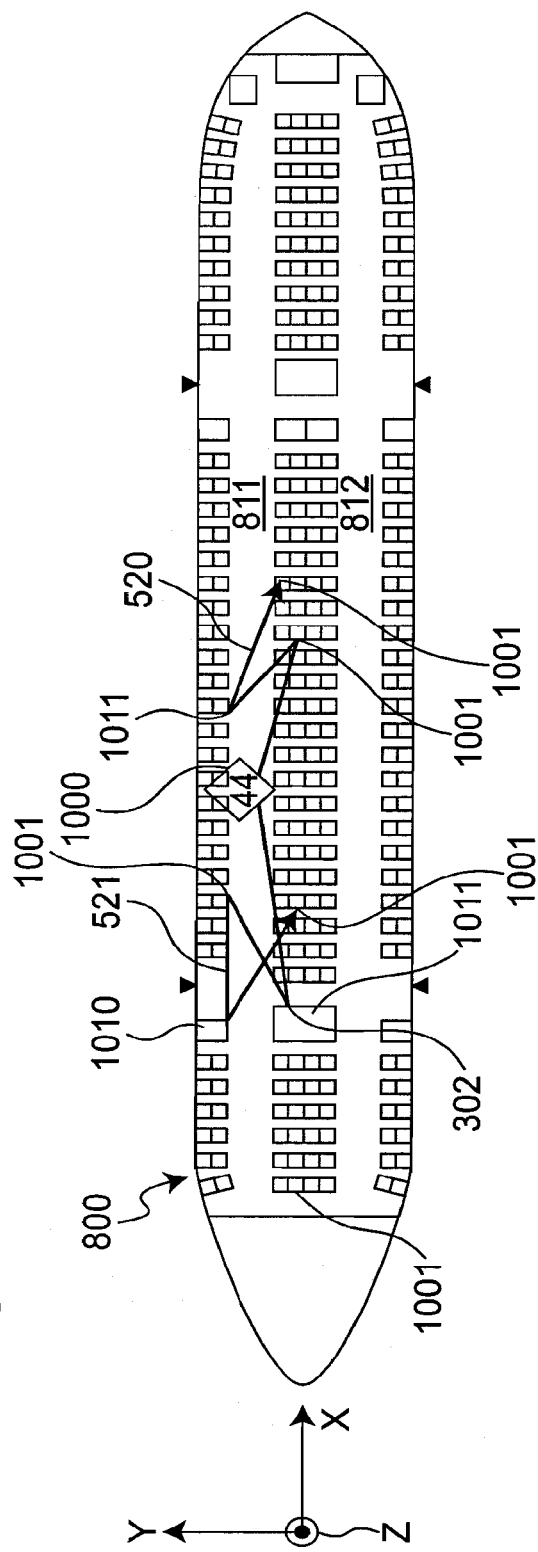
FIG. 5 is a cross-sectional view showing such a state that wireless signals transmitted from one wireless access point unit 1000 shown in FIG. 1 are reflected in the airframe of the aircraft 800 and propagated in the cross direction (X direction) of the aircraft 800.

FIG. 5 is a cross-sectional view showing such a state that the wireless signals transmitted from one wireless access point unit 1000 shown in FIG. 1 are reflected in the airframe of the aircraft 800 and propagated in the cross direction (X direction) of the aircraft 800. Referring to FIG. 5, after being transmitted from the wireless access point unit 1000, a wireless signal 520 is repeatedly reflected by two seats 1001. In addition, the radio wave of the wireless signal 520 is absorbed by the third seat 1001 and disappears. After being transmitted from the wireless access point unit 1000, a wireless signal 521 is reflected by, for example, the cart 302 in the galley 1011, and is reflected by one of the seats 1001 and the lavatory 1010. In addition, the radio wave of the wireless signal 521 is absorbed by one of the seats 1001 and disappears.

As mentioned above, the wireless stations of the wireless access point units 1000 using adjacent channels are allocated on both sides with the radio wave shields such as the seats 1001 and the galley 1011 arranged at the center of the airframe as shown in FIG. 1. In this case, the shields are present between the respective wireless access point units on the both aisles 811 and 812, and then, the environment is created in which the radio waves are repeatedly reflected and is absorbed and in which it is difficult for the mutual radio waves to arrive at the other wireless stations, and this leads to that it makes it possible to reduce the influence of interference.

As already stated above, the radio waves are actually repeatedly reflected and absorbed by various other in-aircraft matters than those stated above in three dimensions, and the radio waves often mutually arrive at the wireless stations between the wireless access point units 1000 between adjacent channels. Nevertheless, by what degree the radio waves that arrive at mutual wireless stations can be reduced is significant in order to reduce an influence of interference. The present invention is effective for reduction of interference for the radio waves, and the two wireless access point units 1000 using adjacent channels are allocated on the different aisles 811 and 812, respectively, and this leads to that it is possible to eliminate the influence of interference by the radio wave shields between the aisles 811 and 812 and high quality wireless transmission can be realized.

Second Embodiment

Figure 6:
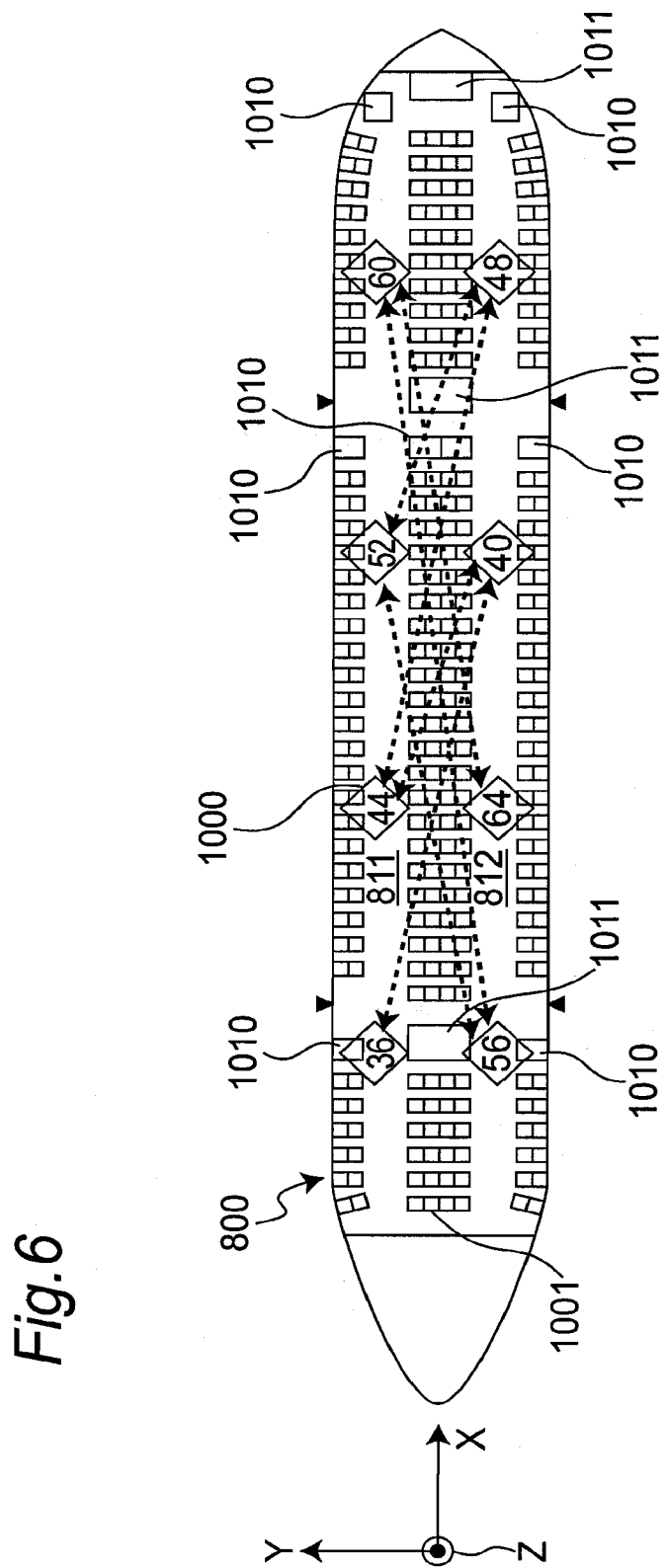
FIG. 6 is a cross-sectional view showing a second allocation example of wireless channels of respective wireless access point units 1000 according to the second embodiment of the present invention.

FIG. 6 is a cross-sectional view showing a second allocation example of wireless channels of the respective wireless access point units 1000 according to a second embodiment of the present invention. FIG. 6 is a cross-sectional view of a passenger compartment of an aircraft 800 in a manner similar to that of FIG. 1. In the present embodiment, in a manner similar to that of the first embodiment, the method will be described, that includes eliminating an influence of interference by the radio wave shields between aisles 811 and 812 by allocating the wireless stations of the respective wireless access point units 100 using adjacent channels on the different aisles 811 and 812, respectively, and that further includes reducing the influence of interference by making a distance between the wireless access point units 1000 using the adjacent channels larger in a cross direction (X direction) of an airframe.

Referring to FIG. 6, a wireless channel number is written in each of the wireless access point units 1000 denoted by a diamond. A dotted-line arrow in FIG. 6 indicates a pair of adjacent channels. The wireless stations of the wireless access point units 1000 using the adjacent channels are allocated on the both aisles 811 and 812, respectively across a central seat row, they are allocated not in parallel to a width direction (Y direction) of the airframe of the aircraft 800, and they are allocated so as to be apart from each other in the cross direction (X direction). Therefore, the radio wave shields at the center of the airframe reduce interference waves by attenuation of the radio waves owing to the distance. Besides, the radio waves from the wireless access point units 1000 serving as interference sources are reduced. Therefore, it is possible to further reduce the influence of the adjacent channel interference, exhibit advantageous effects equivalent to or larger than those of the first embodiment, and provide high-quality wireless communication.

Third Embodiment

Figure 7:
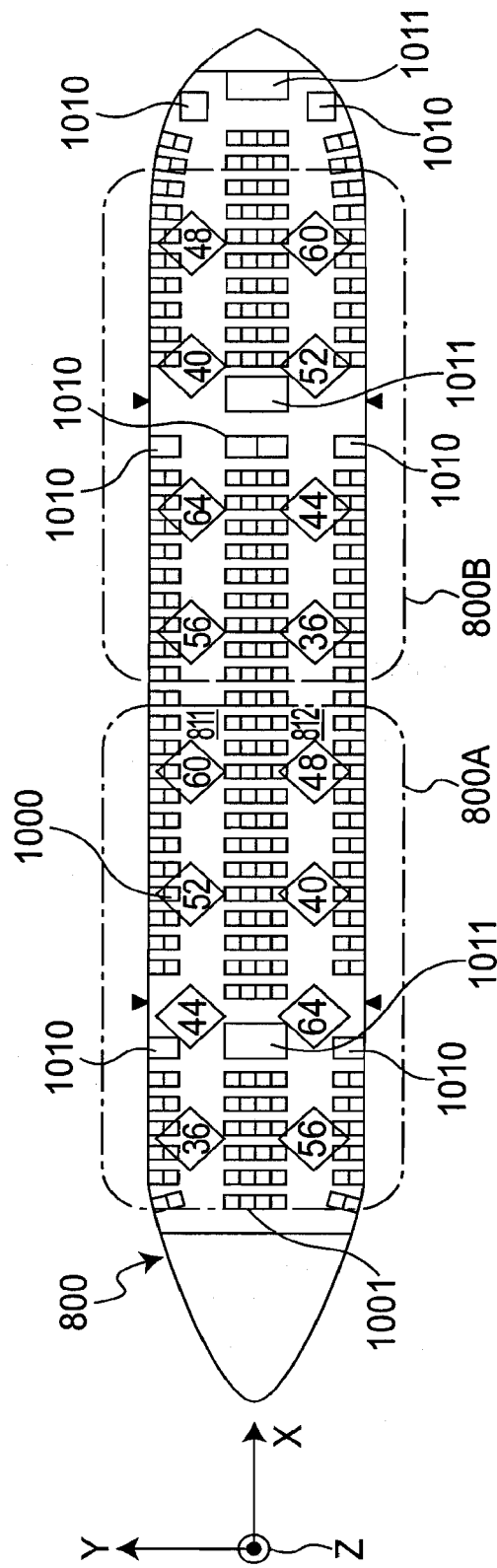
FIG. 7 is a cross-sectional view showing a third allocation example of wireless channels of respective wireless access point units 1000 according to the third embodiment of the present invention.

FIG. 7 is a cross-sectional view showing a third allocation example of wireless channels of the respective wireless access point units 1000 according to a third embodiment of the present invention, and FIG. 7 is a cross-sectional view of a passenger compartment of an aircraft 800 in a manner similar to that of FIG. 1. Referring to FIG. 7, the sixteen wireless access point units 1000 including the same channels are allocated. In the present embodiment, the influence of interference is eliminated by the radio wave shields between aisles 811 and 812 by allocating the wireless stations of the wireless access point units 100 using the same channel on the different aisles 811 and 812, respectively.

In an AV data wireless delivery system, the use of many wireless access points 1000 is considered so as to improve the total band of the entire system. For example, in the present embodiment, the band corresponding to eight channels from the channel 36 to the channel 64 is used. If the band is insufficient by eight wireless access point units 1000, the wireless access point units 1000 of the same channels may be used again.

Description will be given concretely with reference to numeric value examples. For example, if one wireless access point unit 1000 can transmit data with a 40 Mbps band, the eight wireless access point units 1000 can ensure the total band of 320 Mbps. If the total band of 640 Mbps is required, it is necessary to allocate the total of sixteen wireless access point units 1000 by using the respective eight channels twice.

In order to increase the total band, a method of using wireless channels at other frequencies is considered as shown in FIG. 10. However, as long as there is an upper limit to the number of wireless channels that can be used in the system, if the required band exceeds the total band that can be realized by the available channels, it is unavoidable to use the same channels. Concretely, if nineteen available wireless channels shown in FIGS. 15 and 16 are used, the total band of 760 Mbps can be secured by nineteen wireless access point units 1000. If the required band exceeds the 760 Mbps band, the same channels are used. Accordingly, in the present embodiment, an instance of using eight wireless channels will be described by way of example; however, even if different numbers of wireless channels are used, the problem is essentially the same.

Referring to FIG. 7, a wireless channel number is written in each of the wireless access point units 1000 denoted by a diamond. In a range of 800A shown in FIG. 7, the wireless stations of the wireless access point units 1000 using eight different channels are allocated. In a range of 800B, eight wireless access point units 1000 using the same channels are allocated. At this time, the wireless stations of the wireless access point units 1000 using the same channel are allocated on both aisles 811 and 812, respectively, across a central seat row. Therefore, as for the same channels in a manner similar to that of the adjacent channels, as described in the first embodiment with reference to FIGS. 2 and 3, the radio wave shields can prevent traveling of the radio waves, arrival of the radio waves in the same channels can be reduced, and same channel interference is prevented in a manner similar to that of the adjacent channels. This can prevent decrease in the band due to the operation of functions of the CSMA/CA between the same channels. Therefore, it is possible to ensure high-quality wireless transmission.

Referring to FIG. 7, the effect of reducing interference to follow reduction in the radio wave as a result of making the wireless stations of the wireless access point units 1000 using the same channel apart in the cross direction (X direction) of the aircraft 800 can be produced.

As described so far in the respective embodiments, if it is known that the radio wave shields are arranged as structures, it is possible to reduce the interference between the channels, hold down the decrease in the band due to the operation of the wireless system using the wireless system such as the CSMA/CA or the decrease in the band due to packet error or the like by the wireless interference, by allocating the wireless stations of the wireless access point units 1000 using the same channel or the adjacent channel with the radio wave shields interposing between the channels. Moreover, if the other wireless communication method that can coexist without carrier sense is adopted, it is possible to reduce the decrease in the band due to packet error resulting from the interference.

In the embodiment stated above, the wireless channel allocation method and the wireless communication system are realized based on the physical configuration and physical allocation in the aircraft 800. The wireless channel allocation method and the wireless communication system do not need any communication procedure for detecting the radio wave intensity and reducing interference but can be realized by a simple apparatus without need of control circuits, software, and the like. Further, since the wireless channel allocation method is not intended to reduce interference among a plurality of wireless stations that may possibly cause interference in a time division multiple access, it is possible to make effective use of the band.

In the embodiment stated above, the wireless communication system provided in the aircraft 800 has been described. However, the present invention is not limited to this, and may be applied to a wireless communication system in a mobile body such as an aircraft, a train or a bus. A body of each of these mobile bodies is made mainly of metal from viewpoints of signal strength. Since the metal has high radio reflectivity, a probability of emitting the radio waves outward is low, and a probability that the radio waves of wireless channels are reflected by the body of the mobile body and remain inside the body is high. Therefore, it is desired to reduce the interference between the channels. Due to this, the effect of the present embodiment that the interference between the channels is reduced is particularly remarkable large in such an environment. Since the aircraft 800 is particularly required that the airframe has a high signal strength, the windows are made smaller and the body part is larger. Therefore, the probability that the radio waves remain in the airframe of the aircraft 800 is quite high. Moreover, the advantageous effects of the present invention are remarkably large in a manner similar to that of above, in a building or the like having concrete walls or the like without windows since reflectivity of the radio waves by the wall, the ceiling, and the floor is high.

Fourth Embodiment

Figure 12:
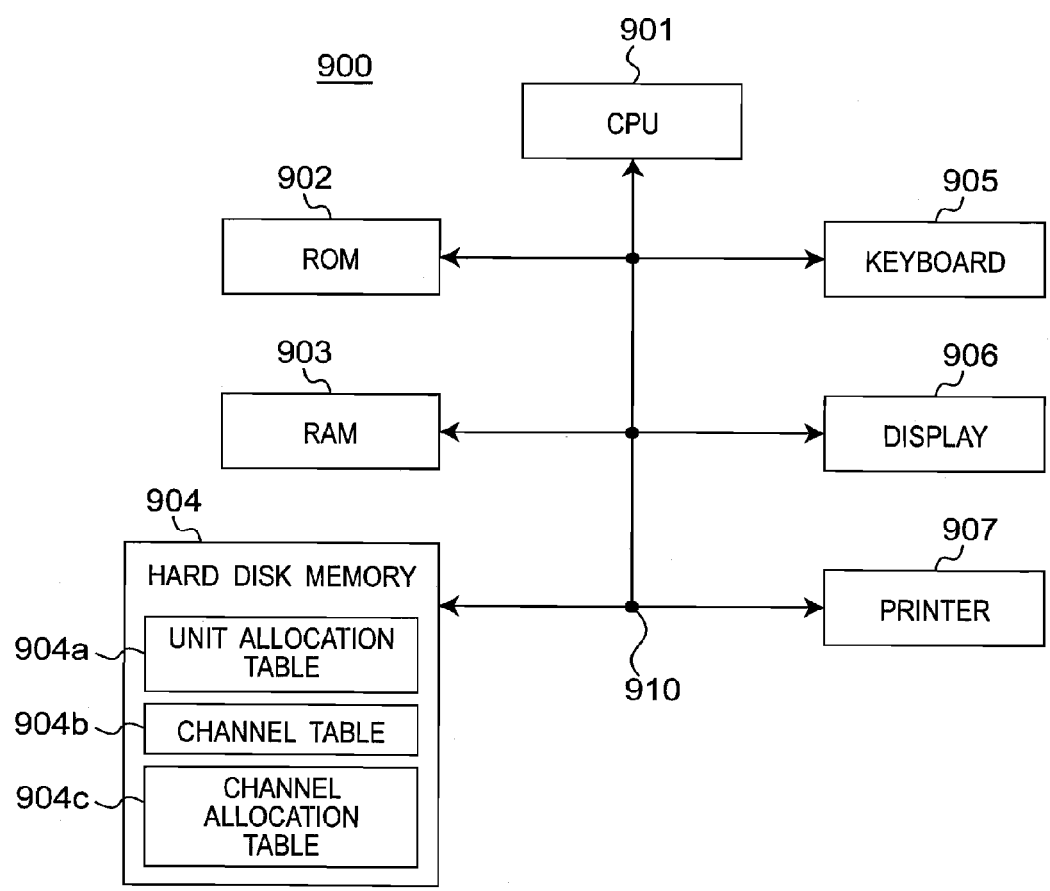
FIG. 12 is a block diagram showing a configuration of a wireless channel allocation deciding apparatus 900 according to the fourth embodiment of the present invention.
Figure 13:
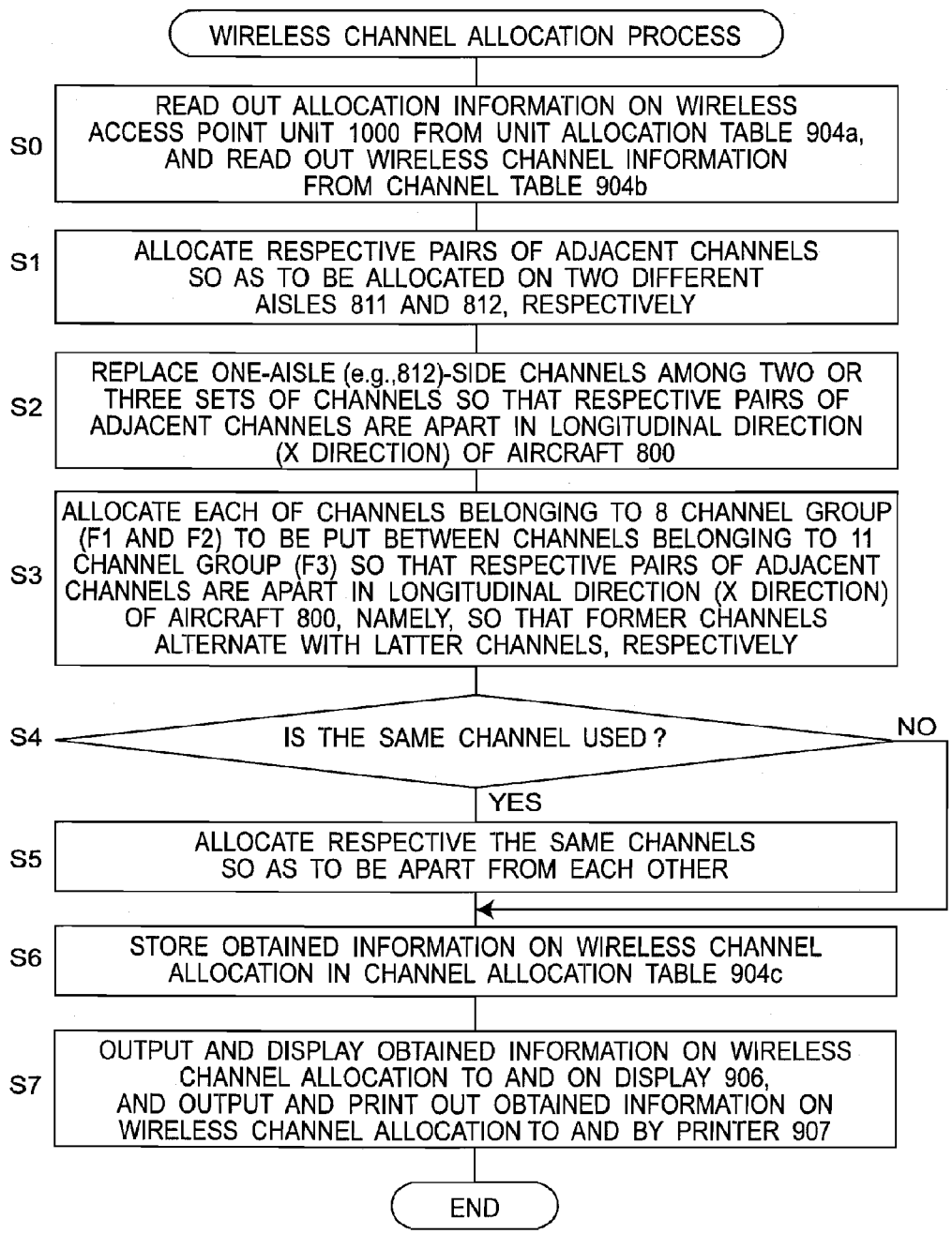
FIG. 13 is a flowchart showing a wireless channel allocation process executed by the wireless channel allocation deciding apparatus 900 shown in FIG. 12.

FIG. 12 is a block diagram showing a configuration of a wireless channel allocation deciding apparatus 900 according to a fourth embodiment of the present invention. FIG. 13 is a flowchart showing a wireless channel allocation process executed by the wireless channel allocation deciding apparatus 900 shown in FIG. 12. The wireless channel allocation deciding apparatus 900 according to the present embodiment is an apparatus for allocating wireless channels of a plurality of wireless access point units 1000 in the aircraft 800 according to each of the above-stated embodiments.

Referring to FIG. 12, a CPU 901 that is a main control unit is concretely constituted by a digital calculator, is connected to the following hardware components via a bus 910, and controls the hardware components. In addition, the CPU 901 executes various software functions to be described later. A display 906, which is a display device such as a liquid crystal display device (LCD) or a CRT display, displays and output the results of executing the wireless channel allocation process. A keyboard 905 includes character keys, ten keys, various function keys, and the like necessary to operate the wireless channel allocation deciding apparatus 900. By changing the display 906 to a touch panel type, the touch panel may be configured to replace a part of or all of the various keys on this keyboard 905. A printer 907, which is, for example, an electro-photographic printer device, prints out the results of executing the wireless channel allocation process.

A ROM (Read Only Memory) 902 stores therein programs of various software necessary for the wireless channel allocation deciding apparatus 900 to operate and executed by the main control unit 901. The programs include at least a program of the wireless channel allocation process shown in FIG. 13 to be described later. A RAM (Random Access Memory) 903, which is constituted by an SRAM (Static Random Access Memory), a flash memory or the like, is used as a working area of the main control unit 901 and stores therein temporary data generated when a program is executed. A hard disk memory 904 includes a unit allocation table 904a for storing therein pre-designed allocation position information on the wireless access point units 1000 in the aircraft 800, a channel table 904b for storing therein information on the wireless channels shown in FIGS. 15 and 16 (Note that the wireless channels belonging to the F4 are not used in the present embodiment, that is, nineteen channels belonging to the F1, F2, and F3 are used in all), and a channel allocation table 904*c* for storing therein a channel allocation that is process results of a wireless channel allocation decision process.

Figure 14:
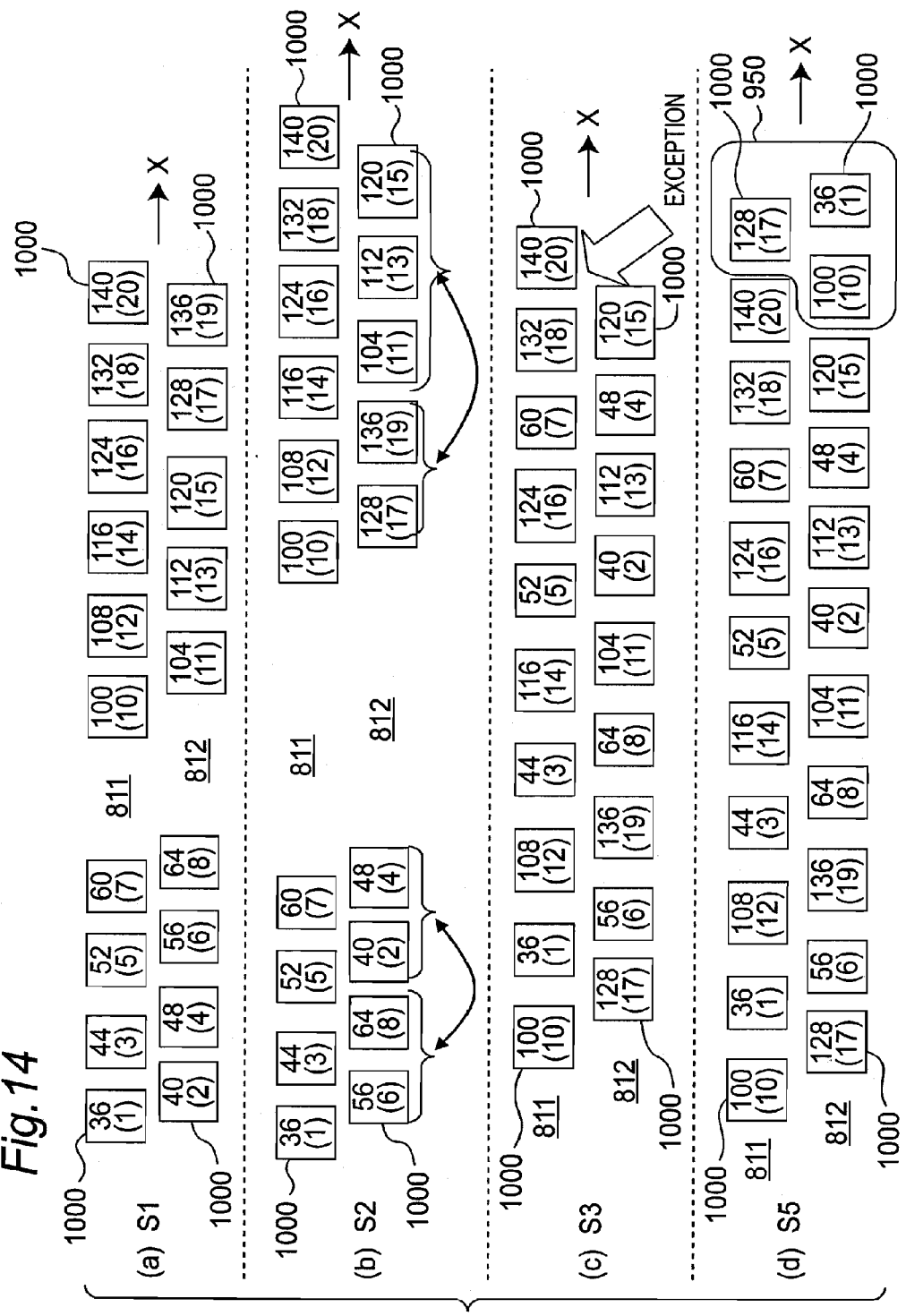
FIG. 14 is a cross-sectional view of the wireless channel allocation in the aircraft 800 for showing a process example when the wireless channel allocation deciding apparatus 900 shown in FIG. 12 executes the wireless channel allocation process.

FIG. 14 is a cross-sectional view of the wireless channel allocation in the aircraft 800 for showing a process example when the wireless channel allocation deciding apparatus 900 shown in FIG. 12 executes the wireless channel allocation process. Referring to FIG. 14, each of the wireless access point units 1000 is indicated by a rectangle and an upper-stage number denotes a wireless channel number and a small-stage parenthesized number denotes a channel serial number that represents a wireless channel to be used serially to each channel group in the form of a natural number for convenience's sake. Referring to FIGS. 13 and 14, the wireless channel allocation process will now be described.

Referring to FIG. 13, at step S0, the wireless channel allocation deciding apparatus 900 reads out the allocation information on the wireless access point units 1000 from the unit allocation table 904*a*, and reads out the wireless channel information from the channel table 904*b*. At step S1, as shown in FIG. 14(*a*), the wireless channel allocation deciding apparatus 900 allocates respective pairs of the channels so as to be allocated on the two different aisles 811 and 812, respectively. At step S2, as exemplarily shown in FIG. 14(*b*), the wireless channel allocation deciding apparatus 900 replaces one-aisle (for example, an aisle 812)-side channels among two or three sets of channels so that respective pairs of adjacent channels are apart in the longitudinal direction (X direction) of the aircraft 800. At step S3, as exemplarily shown in FIG. 14(*c*), the wireless channel allocation deciding apparatus 900 allocates each of the channels belonging to eight channel groups (F1 and F2) to be put between the channel belonging to eleven channel groups (F3) so that respective pairs of adjacent channels are apart in the longitudinal direction (X direction) of the aircraft 800, namely, so that the former channels alternate with the latter channels, respectively. At step S4, it is judged whether or not the same channel is used. If YES at step S4, the process flow goes to step S5. On the other hand, if NO at step S4, the process flow goes to step S6.

At step S5, as exemplarily shown in FIG. 14(*d*), the wireless channel allocation deciding apparatus 900 allocates the respective same channels so as to be apart from each other. In FIG. 14(*d*), 950 denotes that the same channels are allocated repeatedly or second time. Next, at step S6, the wireless channel allocation deciding apparatus 900 stores the obtained information on the wireless channel allocation in the channel allocation table 904*c*. At step S7, the wireless channel allocation deciding apparatus 900 outputs the obtained information on the wireless channel allocation to the display 906 to be displayed on the display 906 or to the printer 907 to be printed out by the printer 907, and finishes the same process.

In the above-stated second embodiment, the obtained information on the wireless channel allocation is outputted to the display 906 to be displayed on the display 906 or to the printer 907 to be printed out by the printer 907. However, the present invention is not limited to this. The wireless channel allocation deciding apparatus 900 may be connected to the LAN switch 501 and set radio frequencies based on the wireless channel allocation decided in the respective wireless access point units 1000 via the network. Alternatively, when the system configuration of the aircraft 800 (concretely speaking, the number of and the allocation of the wireless access point units 1000) is decided, the wireless channel allocation deciding apparatus 900 may decide the wireless channel allocation, and then, set radio frequencies to the respective wireless access point units 1000 via the network based on the results of the wireless channel allocation. In this case, the setting of the radio frequencies based on the wireless channel allocation is made by, for example, writing the radio frequencies to nonvolatile memories (such as flash memories or EEPROMs) provided in the unit controllers 600 of the respective wireless access point units 1000 or by using a DIP switch.

In the process shown in FIG. 13, the two wireless access point units 1000 using the same channel are allocated to be apart from each other. However, the present invention is not limited to this, and the two wireless access point units 1000 using the same channel may be allocated on the two different aisles 811 and 812, respectively.

Modified Preferred Embodiments

In the embodiments as mentioned above, the wireless channel allocation method for the wireless communication system provided in the aircraft 800 including the metal airframe has been described. However, the present invention is not limited to this. Since reflection of the radio wave occurs even to a mobile body using a body made of a material other than the metal, the present invention is also applicable to such a mobile body.

In the embodiments mentioned above, the wireless channel allocation method using the frequency bands described in the IEEE802.11a standard has been described. However, the present invention is not limited to this, and it is applicable to a wireless system in which wireless signal having the same frequencies substantially interfere with one another.

In the embodiments mentioned above, the two wireless stations using the identical wireless channel are allocated on the different aisles 811 and 812, respectively or the two wireless stations using wireless channels adjacent to each other are allocated on the different aisles 811 and 812, respectively. However, the present invention is not limited to these. Alternatively, at least either the two wireless stations using the identical wireless channels and those using the wireless channels adjacent to each other may be allocated on the different aisles 811 and 812, respectively.

In the embodiments as mentioned above, such a case that all the adjacent channels and the same channels are allocated on the different aisles 811 and 812, respectively has been described. However, the present invention is not limited to this. Depending on a combination of wireless channels to be used or on the number of wireless channels, all the channels do not necessarily satisfy these conditions. Even in this case, the advantageous effects unique to the present invention can be obtained between the wireless channels with the radio wave shields interposing between the wireless channels. Moreover, constrained conditions occur to possible in-aircraft allocation positions of the wireless access point units 1000, for example, the wireless access point units 1000 cannot be always allocated at equal intervals in the aircraft 800 depending on the allocation relation among various pieces of equipments. Nevertheless, according to the present invention, the wireless channel allocation can be decided in view of these respects.

In the embodiments as mentioned above, as for the radio wave absorption by human bodies or the radio wave absorption and reflection by the passenger luggage, these are not fixedly located at their positions in advance. However, the seats 1001 are fixedly attached and intended to allow the passengers 204 to be seated at the respective positions of the seats 1001. In addition, the fixed positions of the passenger luggage and cargoes are decided such as the passenger luggage storages 201 and the like and the luggage and the like are stored in the storages 201 and the like. Accordingly, in the actual operating state of the radio waves, the pieces of luggage and the like are arranged fixedly at the positions, so that they can be regarded as the radio wave shields at fixed positions.

In the embodiments as mentioned above, the AV data wireless delivery system that is the streaming transmission system for AV content data using a broadband has been described. In this case, only the transmission from the wireless access point units has been described by way of example since wireless transmission is dominantly the wireless transmission from the wireless access point units 1000 to the wireless client 504 by direct waves. However, in the wireless communication, the wireless transmission also includes the wireless transmission from the wireless client devices 504 in the wireless cell shown in FIG. 11. The present invention is also effective for the reduction of interference between the wireless client devices 504 in different wireless cells and the reduction of interference between the wireless access point unit 1000 and the wireless client device 504 in different wireless cells.

In the embodiments as mentioned above, in the example of the same channel repetition, all the channels are used without repetition, and then, the same channels are repeatedly allocated in FIGS. 7 and 14. However, the present invention is not limited to this. As long as the distance is sufficiently long in the X direction, the wireless access point units 1000 using the same channel may be allocated.

INDUSTRIAL APPLICABILITY

As mentioned above in detail, according to the wireless communication system and the wireless channel allocation method therefore according to the present invention, wireless channels that are the same channels and/or adjacent channels are allocated to put the radio wave shields between channels. More preferably, two wireless stations using the identical wireless channel and/or adjacent wireless channels are allocated on different aisles of the aircraft, respectively, and this leads to reduction in the radio waves arriving at the mutual wireless stations between the channels. Due to this, the interference between the channels is reduced, and the mechanism of transmission waiting is suppressed from functioning. Further, wireless packet errors caused by the radio wave interference are reduced, and this leads to that the wireless band can be effectively used. As a result, it is possible to guarantee wideband and high-quality wireless transmission. The wireless communication system according to the present invention, in particular, is effective as a data transmission system using a plurality of wireless channels since the interference among a plurality of wireless channels can be reduced.

The invention claimed is:

1. A wireless communication system comprising a plurality of wireless stations provided in an aircraft having a radio wave shield arranged at a fixed position,
    wherein at least one range of wireless channel set is provided in the aircraft, the wireless channel set including a plurality of wireless channels of wireless stations provided on both sides of the radio wave shield, the plurality of wireless channels included in the wireless channel set being different from each other,
    wherein, in the range of the wireless channel set, two wireless stations using wireless channels adjacent to each other are allocated on both sides of the radio wave shield at different positions sandwiching a seat group at a center of an airframe of the aircraft, respectively, and
    wherein the two wireless stations are allocated to be apart from each other in a longitudinal direction of the aircraft, such that (i) the two wireless stations do not face each other and (ii) the two wireless stations sandwich at least one further wireless station having a wireless channel different from the wireless channels of the two wireless stations in the longitudinal direction of the aircraft.

2. The wireless communication system as claimed in claim 1,
    wherein each of the wireless stations includes a radiation pattern having a main beam in a direction substantially parallel to a width direction of the aircraft.

3. A wireless channel allocation method for use in a wireless communication system including a plurality of wireless stations provided in an aircraft having a radio wave shield arranged at a fixed position, the wireless channel allocation method including;
    providing at least one range of wireless channel set in the aircraft, the wireless channel set including a plurality of wireless channels of wireless stations provided on both sides of the radio wave shield, the plurality of wireless channels included in the wireless channel set being different from each other;
    allocating, in the range of the wireless channel set, two wireless stations using wireless channels adjacent to each other on both sides of the radio wave shield at different positions sandwiching a seat group at a center of an airframe of the aircraft, respectively; and
    allocating the two wireless stations to be apart from each other in a longitudinal direction of the aircraft, such that (i) the two wireless stations do not face each other and (ii) the two wireless stations sandwich at least one further wireless station having a wireless channel different from the wireless channels of the two wireless stations in the longitudinal direction of the aircraft.

4. The wireless channel allocation method as claimed in claim 3,
    wherein each of the wireless stations includes a radiation pattern having a main beam in a direction substantially parallel to a width direction of the aircraft.

* * * * *